April 24, 1962

A. L. PIZZI 3,030,762

CABLE TWISTING UNITS

Filed April 24, 1961

INVENTOR
A. L. PIZZI
By
ATTORNEY

April 24, 1962

A. L. PIZZI 3,030,762

CABLE TWISTING UNITS

Filed April 24, 1961

INVENTOR
A. L. PIZZI
By
ATTORNEY

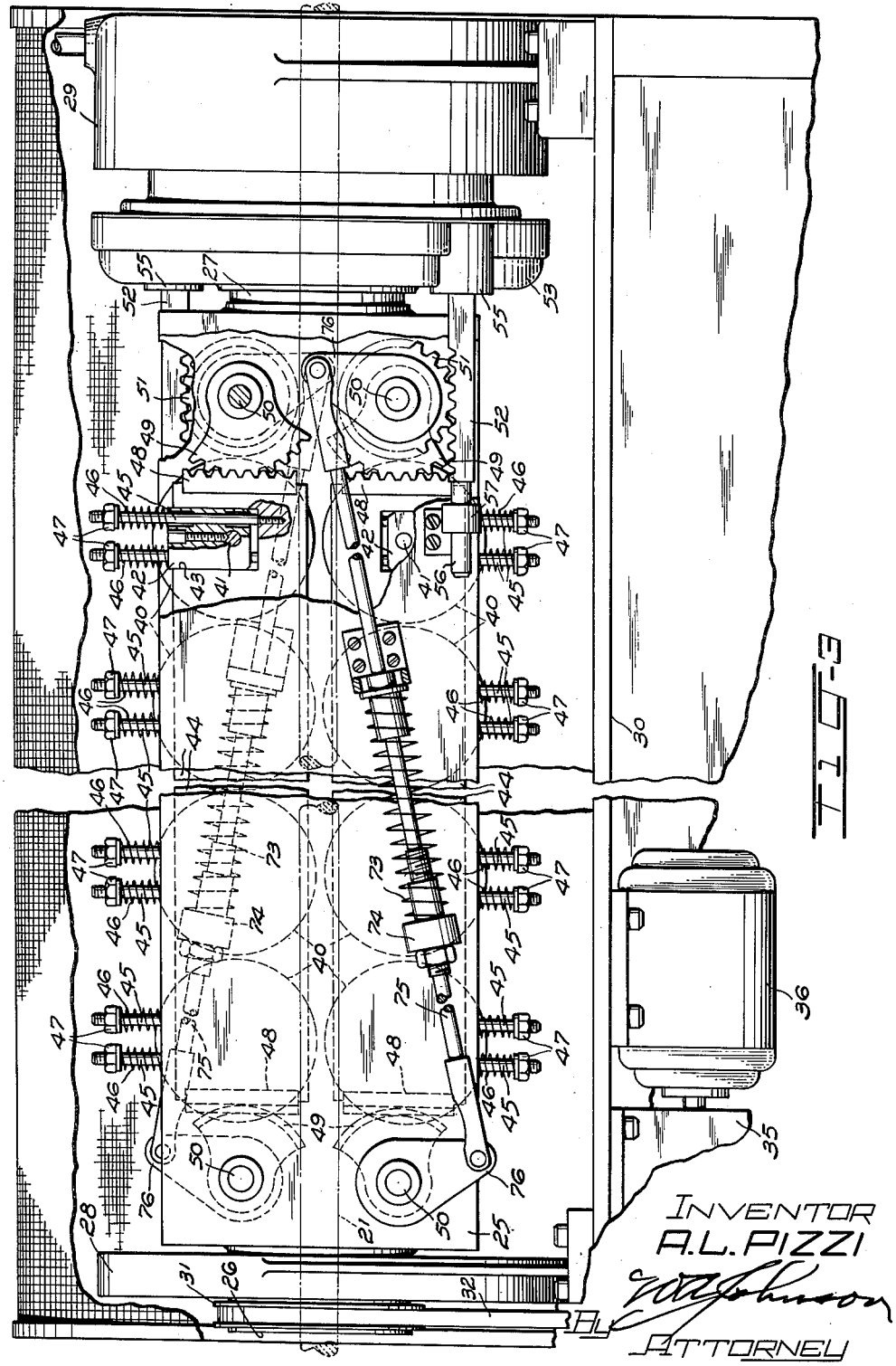

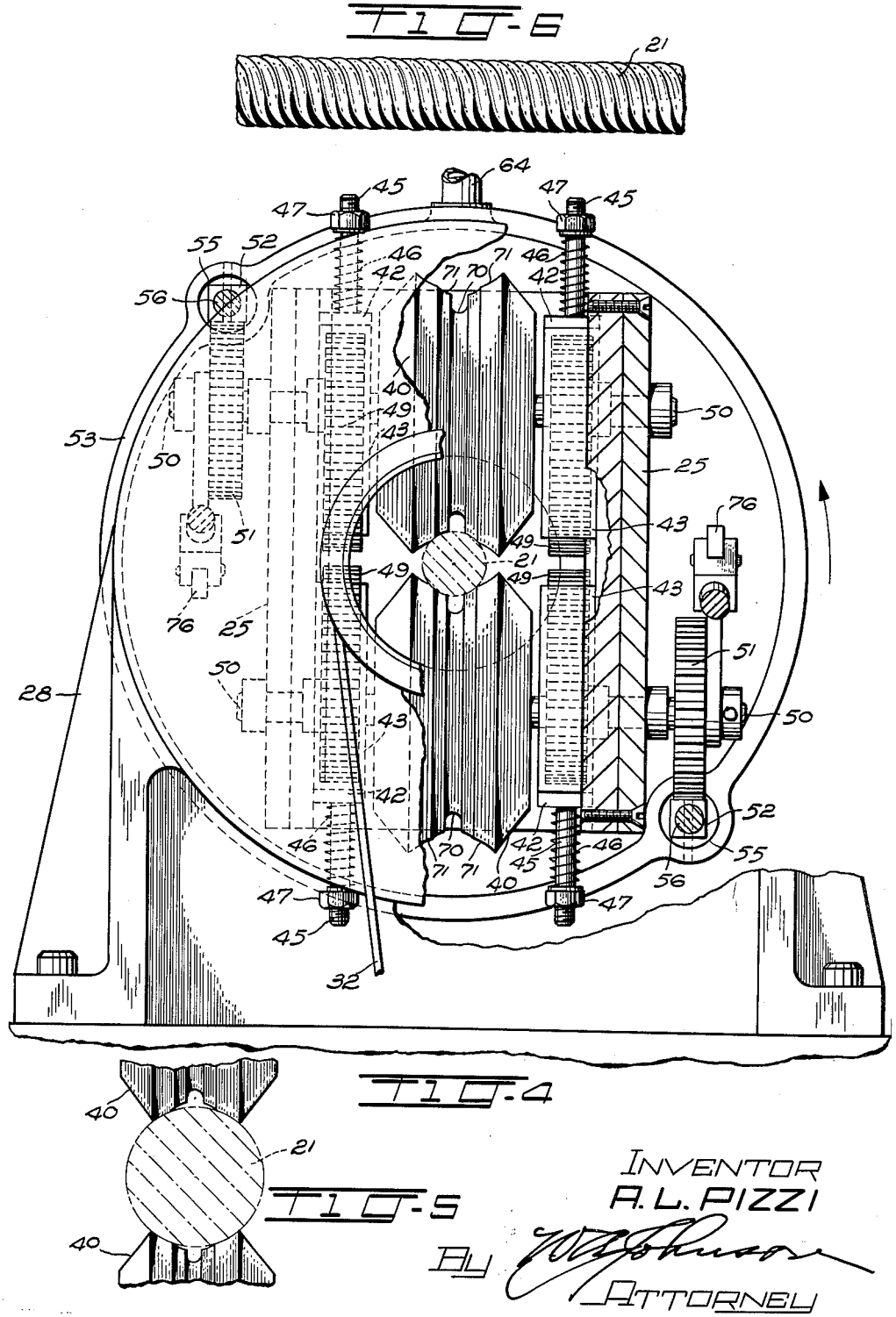

United States Patent Office 3,030,762
Patented Apr. 24, 1962

3,030,762
CABLE TWISTING UNITS
Albert L. Pizzi, Union, N.J., assignor to Western Electric Company, Incorporated, a corporation of New York
Filed Apr. 24, 1961, Ser. No. 105,192
6 Claims. (Cl. 57—66.5)

This invention relates to cable twisting units, particularly units disposed in machines for making cables of groups of strands.

In the manufacture of cables, particularly those used in the telephone art, although the groups of strands forming the cables may vary in size from a single unit cable with a small number of strands or pairs of strands to large cables with hundreds of strands or pairs of strands, these groups of strands, in each instance, must be twisted together to form compact cables. Furthermore, cables of this type, subsequent to the initial stranding or grouping of the strands into single or multi-unit formations, must receive protective sheaths before they are completed for use. Therefore, from the initial cable forming machine where the cables are wound on a take-up reel or a core truck, the cables must be transferred to the sheathing machine where they are unwound from the reel or core truck while advancing through the sheathing machine. To perform the sheathing operation successfully, it is important that there be no internal stresses in the unsheathed cable tending to cause the unsheathed cable to untwist or to move in a snake-like path from the reel to the sheathing machine. To overcome these difficulties, it is advantageous to determine the twist desired in each cable, which may vary with cables of different sizes, and to pre-set those twists in each cable prior to reaching the take-up unit in the initial cable forming machine.

An object of the invention is a twisting unit for use in a machine for making cables which is highly efficient in pre-setting predetermined twists in the cables.

In accordance with the object, the invention is embodied in a machine, for forming cables of groups of strands, having a take-up unit rotatable about its axis to produce a given twist in a cable in one direction and having a take-up reel rotatable about an axis disposed at right angles to the axis of the take-up unit, to advance the cable longitudinally through a sizing die and in a given path from the sizing die to the take-up unit. In the present embodiment of the invention, the twisting unit is disposed concentric with the path, is rotatable about an axis coincident with the path, and has companion rollers controlled by certain means normally forcing the rollers outwardly away from the path and controlled also by a different means adapted to force the rollers toward the path and into engagement with the cable so that during rotation of the unit in the same direction as the twist applied by the take-up unit, the predetermined twist for the cable is pre-set in the cable prior to reaching the take-up unit.

More specifically, the twisting unit has holders for sets of rollers disposed on opposing sides of the path, normally driven by racks and gear segments under forces of springs away from the path to facilitate threading the cable through the twisting unit and further actuated by a movable piston of a stationary air cylinder mounted in one of the heads of the twisting unit and operatively connected to the actuating means for the holders supporting the rollers so that the single piston, operated by fluid under pressure, may cause application of equal pressures through the rollers to the cable while the body of the unit is rotated to produce a predetermined twist in each cable as the cable is advanced from the sizing die to the take-up unit.

Other objects and advantages will be apparent from the following detailed description when considered in conjunction with the accompanying drawings wherein:

FIG. 3 is a side elevational view of the twisting unit shown in closed position;

FIG. 4 is a vertical sectional view of the twisting unit shown in closed position on a cable of a given size;

FIG. 5 is a fragmentary sectional view illustrating a pair of companion rollers engaging a cable of a larger size; and FIG. 6 is a fragmentary detailed view of a portion of a cable.

Figure 1:
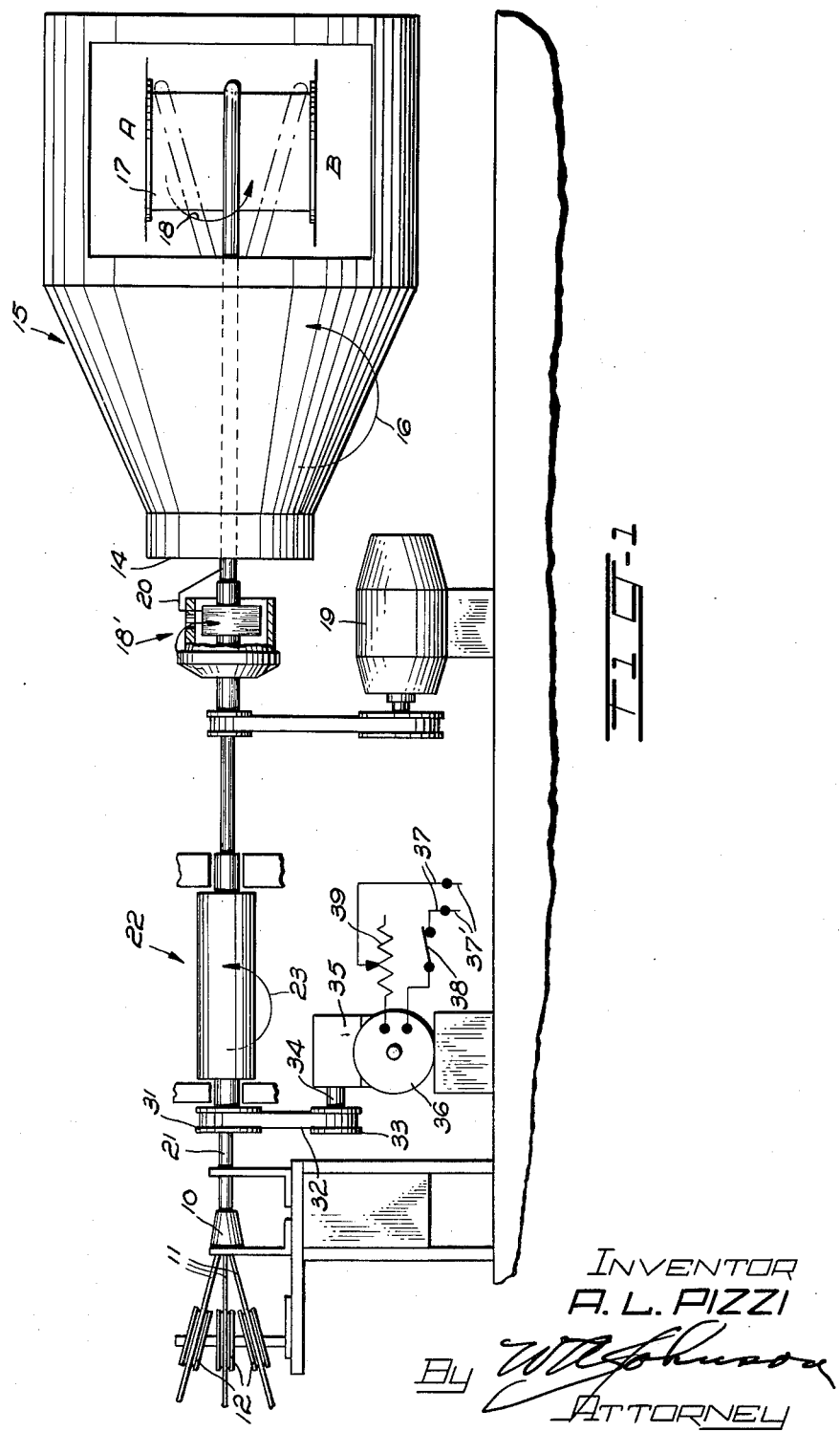
FIG. 1 is a schematic side elevational view of cable forming machine embodying the twisting unit.
Figure 2:
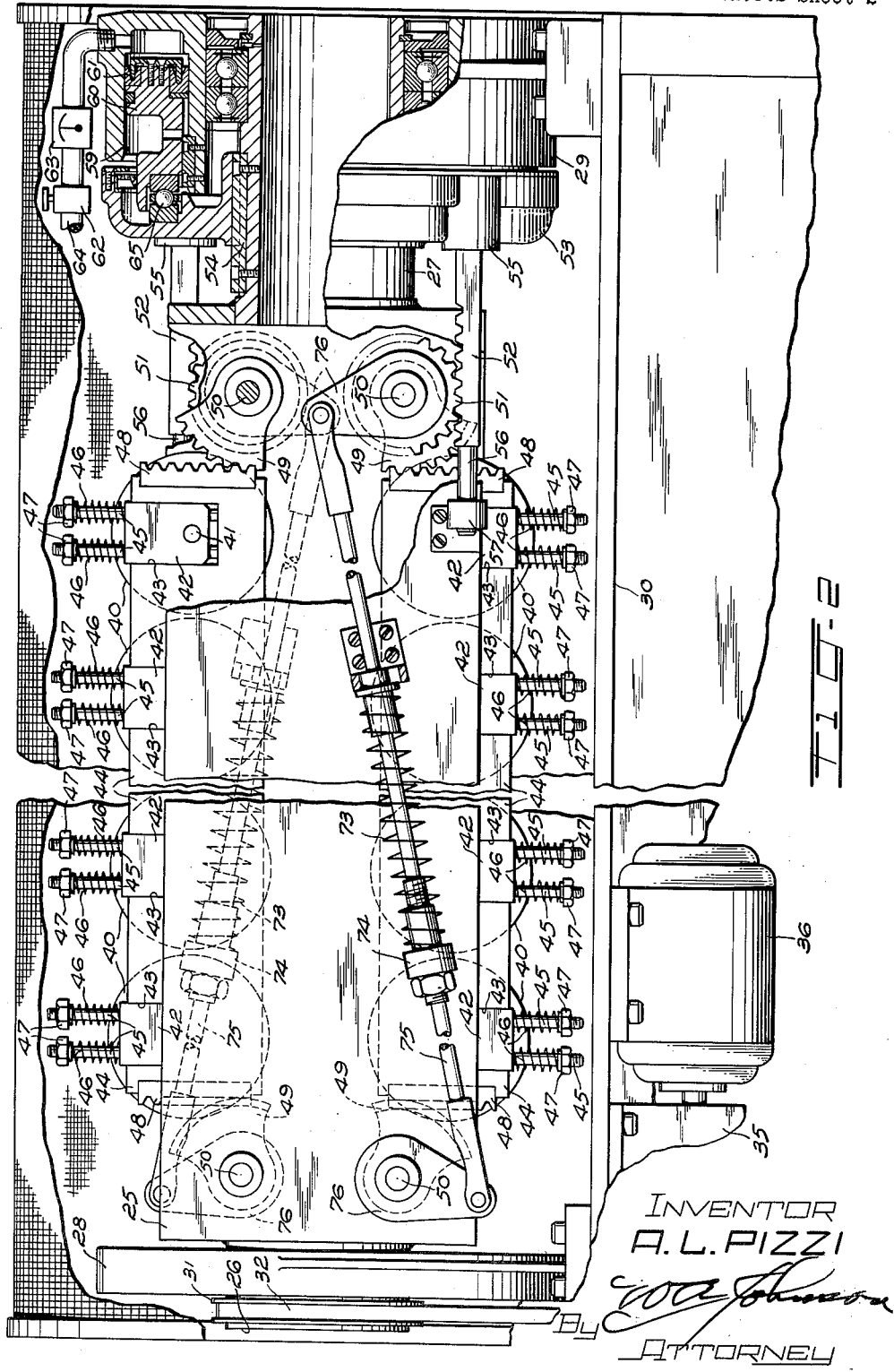
FIG. 2 is a side elevational view of the twisting unit shown in open position, portions thereof being shown in section.

The cable forming machine, shown schematically in FIG. 1, illustrates a sizing die 10 receiving, in the present instance, a plurality of cable units 11 formed of groups of strands or insulated wires, guided by rollers 12 into the die. The various structures in FIG. 1 are shown closer together than in actual practice, the distance between the sizing die 10 and an entrance end 14 of a take-up unit 15 being several feet in length. The take-up unit 15 is rotated in the direction of an arrow 16 about a given axis and removably houses a take-up reel or core truck 17 which is rotated in the direction of an arrow 18 about an axis disposed at right angles to the axis of the take-up unit 15. There are certain features normally disposed in the area between the sizing die 10 and the entrance end 14 of the take-up unit. Only one of these units is shown, this being a binder unit 18' driven by a motor 19 to wrap suitable lengths of insulating material 20 about the cable 21.

The cable 21 is moved in a given path, advanced by the rotation of the take-up reel 17, and given a predetermined twist in the direction of the arrow 16 by the take-up unit 15. Without additional means for pre-setting this given twist, there will exist internal stresses in the cable causing disturbances when the cable is unwound from the reel 17.

To overcome these disturbances, a twisting unit, indicated generally at 22, is mounted concentric with the path of the cable 21 and rotated in the direction of an arrow 23 which is the same direction as that of the take-up unit 15.

The twisting unit 22 is shown in detail in FIG. 2 to 5, inclusive, it being composed of a longitudinal body 25, hollow throughout its center for the passage of the cable therethrough, and having ends 26 and 27 rotatably supported by heads 28 and 29 mounted on a bracket on base 30. The end 26 has a pulley 31 mounted thereon and is connected by a belt 32 to a pulley 33 mounted on an output shaft 34 of a speed reducing unit 35. The speed reducing unit 35 is driven by a motor 36 which is a variable speed motor controlled by a suitable circuit such as that shown in FIG. 1. The circuit through lines 37 into the main drive circuit (lines 37') to coordinate accelerating, decelerating speeds of all units, is under the control of a switch 38, and a potentiometer 39, the latter controlling the speed of the motor 36 during normal operation and thereby controlling the general speed of rotation of the body 25.

A desired number of pairs of companion rollers 40 are supported by spindles 41 for rotation in the body on opposing sides of the path of the cable 21. The spindles 41 have their ends supported by pairs of blocks 42 disposed in recesses 43 of a pair of holders 44, guided in their movements in the recesses by rods 45, and normally urged inwardly into their recesses by springs 46 disposed concentric with the rods 45. Actually, the pairs of rods 45 for each block 42 extend through apertures in the blocks and have their inner ends threadedly mounted in its holder 44. Nuts 47 adjustably mounted on the outer ends of the rods 45 function to vary and set predetermined forces in the springs 46 so that forces applied to the holders to move them toward the cable 21 will be translated through the rods, starting with their threaded end, through the nuts 47, the springs 46, the blocks 42, and the spindles 41, to the rollers. The holders 44, movably mounted in the body, are elongated block-like structures of sufficient length to house in their recesses 43 all of the blocks 42 of the pairs of rollers 40 and have racks 48 mounted on the ends thereof. This provides a pair of racks 48 for the ends of each holder 44 into engagement with which are pairs of gear segments 49. The gear segments 49 are fixedly mounted on shafts 50 which are journalled in suitable bearings supported by the body 25. Each of the shafts 50, at the right end of the body, has a pinion 51 fixedly mounted thereon, these pinions interengaging racks 52 of an actuator 53 shown in FIG. 2.

The actuator 53 is disposed concentric with the end 27 and keyed thereto as at 54 for rotation with the body and for movement axially of the end 27. One end of each of the racks 52 is fixed to the actuator 53, as illustrated at 55, while the other end thereof has a pin-like projection 56 slidably disposed in an apertured member 57 of the body 25.

In the present instance, the head 29 is in the form of a cylinder having an internal annular cylinder portion 59 in which an annular piston 60 is disposed. The right end of the piston 60 has suitable sealing means 61 forming a fluid-tight connection between the inner walls of the cylinder and the piston, to be under the influence of fluid under a pressure controlled by a valve 62 and indicated by a meter 63 in a fluid line 64. The left end of the piston 60 is adapted to cause actuation of the actuator 53 through a bearing 65.

The rollers 40 are identical in structure and provided with central grooves 70 separating diagonally extending surfaces 71 providing 4-point contacts with the cable 21 regardless of whether the cable is small, as shown in FIG. 4, or larger, as shown in FIG. 5, to produce equal 4-point pressures at spaced positions on the cable to positively control the driving connection between the twisting unit and the cable without disturbing or causing damage to the strands of the cable.

*Operation*

After the cable has been threaded through the various units of the machine, shown in FIG. 1, including the twisting unit 22, and these various units are set in operation, the cable 21 is advanced longitudinally bringing the strands or groups of strands together as they enter the sizing die 10 and forming a given twist in the cable as the take-up unit 15 is rotated during the longitudinal advancement of the cable during rotation of the reel or core truck 17. Prior to this action, however, it has been determined what pressure is desired to be applied to the cable through the companion rollers of the twisting unit 22 and also the speed of rotation desired for the twisting unit to pre-set the given twist in the cable. These conditions are determined and controlled during the threading of the cable through the machine and also through the twisting unit 22, so that at the completion of the threading operation, the cable forming machine may be set in operation simultaneously with the driving of the twisting unit 22.

During this action, the companion rollers 40 have been moved simultaneously toward the path of the cable and through the force of the single means, namely the piston 60, uniform pressure is applied by the pairs of companion rollers 40 throughout the length of the twisting unit 22, to twist the cable in the same direction that the take-up unit is twisting the cable, but with greater twisting force to pre-set the predetermined twist in the cable in an area closely adjacent the sizing die 10. Actually, the pre-set twist occurs between the sizing die and the twisting unit.

It should be understood that after the cable leaves the twisting unit 22, there is some distance when the cable is free and there will exist, in this area, a certain untwisting of the cable to allow what is called live internal stresses in the cable to escape therefrom leaving only the dead or pre-set twist desired in the cable. However, due to the fact that the twisting unit 22 has twisted the cable in the given direction sufficiently to pre-set the given twist in the cable and that the cable is bound by unit 18 to retain the pre-set twist, the various strands of the cable will take extra action given the cable by the distributor in take-up unit 15, without disturbing the bound pre-set condition of the cable. These extra actions may be apparent from viewing FIG. 1. If the cable, after the setting of the twist and the binding by unit 18, should continue to travel in a straight line, there would be no disturbances but there are different actions on the cable, (1) winding the cable on the reel, (2) bending the cable toward end A, and (3) bending the cable toward end B. These actions tend to apply a pulling force on the outer portion of each arcuate bend in the cable and attempt to shorten or buckle the inner portion of each arcuate bend. However, with the pre-set twist established in the cable and the cable bound in this condition, any disturbance to the cable during the distribution and take-up of the cable on the reel, will not be permanent but will disappear when the cable is unwound from the reel.

After the length of cable has been produced by the machine, the twisting unit may be opened by the removal of the fluid under pressure at the right of the piston 60, freeing spring 73 under variable forces through units 74 on rods 75 connected to levers 76 mounted on the shafts 50, to rotate the shafts in directions to cause their gear segments 49 to move the holders 44 outwardly, thus moving the rollers 40 free of the cable or away from the path of the cable for the threading of a new cable through the unit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a machine, for forming cables of groups of strands, having a take-up unit rotatable about its axis to produce a given twist in a cable in one direction and having a take-up reel rotatable about an axis disposed at right angles to the axis of the take-up unit to advance the cable longitudinally through a sizing die and in a given path from the sizing die to the take-up unit, a twisting unit disposed concentric with the path between the sizing die and the take-up unit and having an elongated hollow body disposed concentric with the path, stationary heads disposed at opposing ends of the body and jointly supporting the body for rotation about an axis coincident with the path, a drive means operatively connected to one end of the body to rotate the body at a predetermined speed, companion rollers disposed on opposing sides of the path and having grooved peripheries to engage and grip the cable, spindles supporting the rollers for rotation by the advancing cable, rows of companion blocks for supporting the ends of each spindle supported for movement relative to the path in the body, separate means carried by the body and actuated under predetermined forces to move the blocks outwardly to move their rollers away from the path, and a single actuating unit carried by one of the heads and actuable to cause movement of the blocks simultaneously toward the path to urge the companion rollers into engagement with the cable under like forces to give the cable a predetermined greater twist than that given by the take-up unit and in the same direction to pre-set the given twist in the cable.

2. A twisting unit according to claim 1 in which the drive means for the body includes a variable speed motor driven continuously in one direction at a predetermined speed controlled by a current varying unit to control the predetermined greater twist on the cable.

3. A twisting unit according to claim 1 in which diagonally extending surfaces disposed on opposite sides of central peripheral grooves in the companion rollers provide four point contacts with cables of different sizes to provide maximum contact with the cables.

4. A twisting unit according to claim 1 in which an elongated holder is provided with recesses for each row of blocks, guide pins for the blocks extending through the blocks and having their inner ends fixed to their respective holder, and springs disposed concentric with the pins and engaging their blocks under like but variable forces.

5. A twisting unit according to claim 4 in which the single actuating unit includes an annular cylinder mounted in one of the heads concentric with the axis of the body, an annular actuator mounted for rotation with the body and axially thereof, a driving element for each holder fixed to the holder and adapted to cause movement of their holders toward the cable when moved away from the cylinder, and an annular piston extending into the cylinder.

6. A twisting unit according to claim 5 in which a supply line for fluid under pressure is connected to the cylinder, a valve in the line to control the flow of the fluid into the cylinder, and a gage in the line to indicate the pressure of the fluid therein.

References Cited in the file of this patent

UNITED STATES PATENTS 2,763,979     Swanson _____ Sept. 25, 1956

FOREIGN PATENTS 1,182,473     France _____ Jan. 19, 1959